United States Patent [19]

Lamy

[11] 4,135,844

[45] Jan. 23, 1979

[54] LAYING OF UNDERWATER PIPELINES

[75] Inventor: Jacques E. Lamy, Fontenay-aux-Roses, France

[73] Assignee: Compagnie Generale pour les Developpments Operationnels des Richesses Sous-Marines "C.G. DORIS", Paris, France

[21] Appl. No.: 813,977

[22] Filed: Jul. 8, 1977

Related U.S. Application Data

[63] Continuation-in-part of Ser. No. 757,098, Jan. 5, 1977, Pat. No. 4,096,705.

[30] Foreign Application Priority Data

Feb. 18, 1977 [FR] France .................................. 77 04782

[51] Int. Cl.² .............................................. F16L 1/04
[52] U.S. Cl. .................................... 405/171; 405/172
[58] Field of Search ............... 61/108, 107, 109, 110, 61/111, 112, 113, 114; 114/253, 242

[56] References Cited

U.S. PATENT DOCUMENTS

| 3,524,325 | 8/1970 | Brown | 61/110 |
| 3,724,224 | 4/1973 | Matthews, Jr. | 61/110 |
| 3,849,997 | 11/1974 | Gower | 61/112 |

FOREIGN PATENT DOCUMENTS

| 1116757 | 6/1968 | United Kingdom | 61/107 |
| 1225126 | 3/1971 | United Kingdom | 61/112 |
| 1434357 | 5/1976 | United Kingdom | 61/112 |

Primary Examiner—Mervin Stein
Assistant Examiner—Alex Grosz
Attorney, Agent, or Firm—Laurence R. Brown

[57] ABSTRACT

For laying a pipeline on the sea bed to interconnect first and second spaced underwater installations, a pipeline section is towed from the first to the second installation, the front and rear ends being maintained above the sea bed by a system of floats and trail-ropes and the intermediate portion of the pipeline section being ballasted so as to be supported on the sea bed, whereafter the two end portions of the pipeline are inserted into the respective installations, and the floats eventually ballasted or liberated.

18 Claims, 12 Drawing Figures

LAYING OF UNDERWATER PIPELINES

This is a continuation-in-part of my co-pending U.S. patent application Ser. No. 757,098 filed Jan. 5, 1977, now U.S. Pat. No. 4,096,705.

This invention relates to the laying, on the bed of the sea or of a body of water, of a pipeline intended, for example, to serve as an oil duct or a gas duct.

It is known to draw from the shore to the open sea a pipeline progressively increasing in length composed of units, initially stored on land, which are successively added to the rear end, still on the shore, of the portion of the pipeline already submerged. The pipeline units themselves consist of a certain number of pipes assembled together end-to-end and capable of being of considerable length of the order of 1 km or even more. The assembly of the tubes to each other and the assembly of the elements to the rear end of the pipeline can easily be effected by welding, provided this is carried out on land.

It is also known to give the pipeline, while it is being laid, a slightly positive buoyancy and to equip it, in various positions, with chains or cables resting on the sea bed and acting as trail-ropes. The pipeline is thus held in equilibrium near to the bed by the system of trail-ropes and possibly by floats which give it a tendency to rise if it does not itself have a positive buoyancy. One can thereby tow lengths of tubes of several kilometers, their length being limited solely by the pulling force necessary to overcome the friction of the trail-ropes on the bed. This friction is obviously less than that which it would be necessary to overcome if the previously ballasted pipeline were dragged directly on the bed, but it can be relatively high if it is necessary to provide trail-ropes sufficiently heavy to prevent the pipeline deviating under the action of rapid transverse currents.

It is in fact possible to exert very great pulling forces, either by means of tugs or by means of winches located on barges anchored to the sea bed. For example, one can effect towages over sufficiently long distances by means of tugs exerting pulling efforts of the order of 200 to 300 tons but that involves considerable expense. In any event, there is obviously a limit to the length of pipeline that can be towed; there is no question of towing lengths of pipeline exceeding several tens of kilometers, while one can now envisage the laying of pipelines of several hundreds of kilometers. It is thus necessary to consider effecting the joining of pipes at sea. It is not impossible to carry out such joining on the sea bed since apparatus exists which would permit welding at a certain depth, for example by means of caissons or diving bells, and since a pipe maintained in equilibrium by a system of trail-ropes is easier to handle than a pipe resting heavily on the sea bed. However, the devices for welding at depth are very expensive and take a long time to get into operation.

Accordingly, an object of the invention is to provide a method and an apparatus which are effective for enabling welding operations to be carried out on or very near to the surface. The joints can thus be effected easily, rapidly and cheaply. An additional advantage is that it is no longer necessary to contemplate towing very long sections of pipeline so that there can be considerable economy in towing costs.

To this end, the pipeline sections are towed while maintaining their front and rear ends on or near the surface and the remainder on or near the bed, and then the rear end of each section is connected to the front end of the preceding section. The front and rear end portions, which are thus kept afloat, have a certain flexibility; it is thus easy to connect them and then allow them to descend gently on to the bed.

Pulling and holding forces may be exerted at points situated respectively a certain distance from the front and rear ends of a pipeline section being towed, by means of towlines connected respectively to a towing machine and a holding machine; the end portions of the pipeline section, i.e. the portions situated respectively in front of and behind these two points are then connected respectively to the two machines and are provided with means, such as floats, which give them a positive buoyancy, and preferably with systems of trail-ropes, so as to maintain the ends of said pipeline section on or near the surface.

The principal portion of the pipeline section, i.e. that comprised between the front and rear end portions, may be connected at a plurality of positions, by means of suspenders, to a traction distribution cable extending right along the pipeline section and of which the two ends are connected respectively to a pulling machine and a holding machine. As in the embodiment described in the preceding paragraph, the front and rear end portions are connected respectively to these two machines and provided with devices to give them a positive buoyancy, and preferably with trail-rope systems.

One can thus, for example, after having towed a first section of pipeline towards the open sea, progressively as one constructs it by the addition of successive sections to its rear end, while maintaining its front end near the surface, fix this front end to a dead weight while one tows towards the open sea a pipeline section constructed in the same way and then tow it while maintaining its front and rear ends near to the surface until this rear end is located near the front end of the first section, then cause the two adjacent ends to rise to the surface, for example by pumping air into their floats, join them together by welding the loop thus formed and finally allow the latter to descend to the bed, for example by ballasting their floats and by controlling its descent by means of a cable exerting on it a lateral traction to avoid the application of excessive constraints to the pipeline. One can then proceed in the same manner for a third section, and so on.

One of the advantages of the method described above is that it is possible, by facilitating the connection, to limit the length of the sections towed, and consequently the towing effort. The intermediate portion of the pipeline sections, comprised between the front and rear ends, can rest directly on the bed, but in case the laying of a very long pipeline is contemplated, it will be an advantage to divide the pipeline into sections of the greatest possible length compatible with the towing force available, and the intermediate portion will be given a positive buoyancy (for example by means of floats) and will be provided with cables or chains which drag on the bottom in the manner of airship trail-ropes.

A further object of the invention is to provide a method and an apparatus which enable two spaced underwater installations or sites, such as a petroleum borehole and the base of a platform or reservoir structure, to be connected easily and cheaply by a submerged pipeline.

To this end, the pipeline is towed to locate it between the two underwater sites or installations while maintaining the front and rear end portions in the midst of waters at a distance above the bed and maintaining the rest of the pipeline on the bed or adjacent thereto, and then one makes use of the relative flexibility of these floating end portions to insert them into the said sites or installations and ballasts said end portions to lie on the bed.

In most cases, the underwater sites that need to be connected by the pipeline are not very far apart, so that the pipeline is not very long and it is generally advantageous to allow its intermediate portion (comprised between its end portions) to rest directly on the bed during towing. It is indeed simpler than providing the intermediate portion with floats and trail-ropes; furthermore, if there are transverse currents in the laying zone, the rubbing of the pipeline on the bed will prevent deviation.

On the other hand, the front and rear portions could have a positive buoyancy, during the towing, either per se (for example by being filled with gas) or in association with floats, and are preferably provided with trail-ropes. Towing can be carried out, as hereinbefore described, by exerting pulling and holding forces on the intermediate portion of the pipeline, that is to say either to the front and rear ends respectively of this intermediate portion, or by means of a traction distribution cable connected to the pipeline at several points.

However, in case the pipeline is not very long and the ends are not far from the bed, the pulling and holding forces can be applied to the ends of the pipeline; the holding force can also be omitted.

The following description, with reference to the attached drawings, given as non-limiting examples, will enable the advantages of the invention and the manner of carrying it into effect to be better understood. In the drawings.

Figure 1:
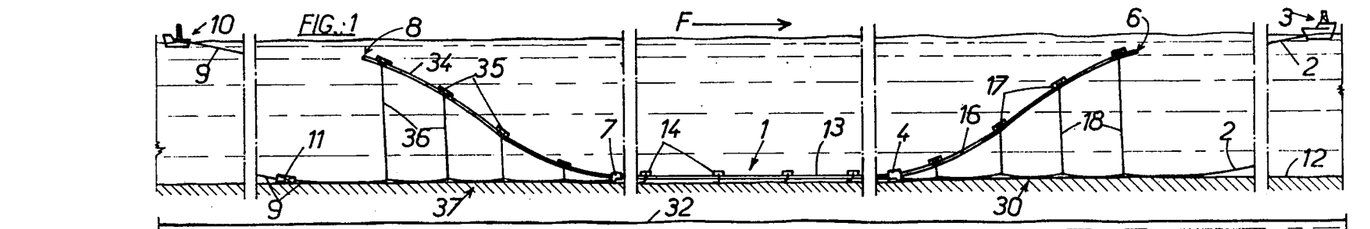
FIG. 1 is a diagrammatic side view of a pipeline section in the course of being towed.
Figure 2:
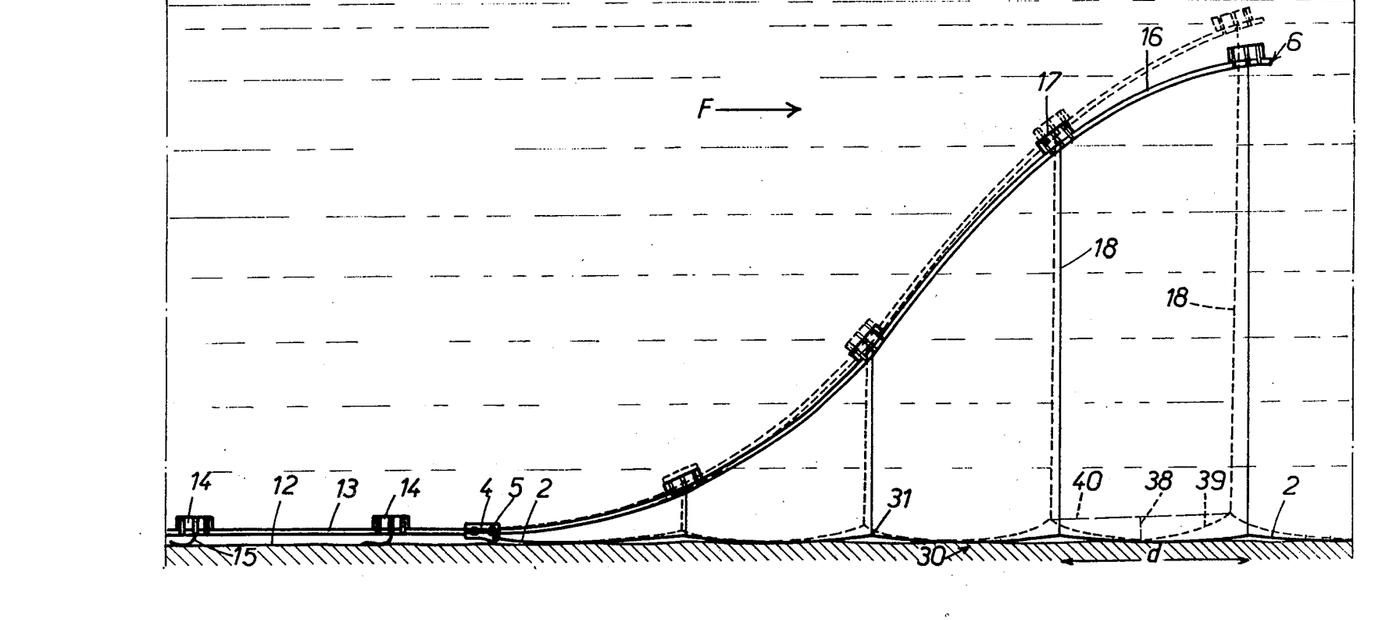
FIGS. 2 and 3 are views similar to FIG. 1, showing on a larger scale the front and rear portions, respectively, of the pipeline section.
Figure 3:
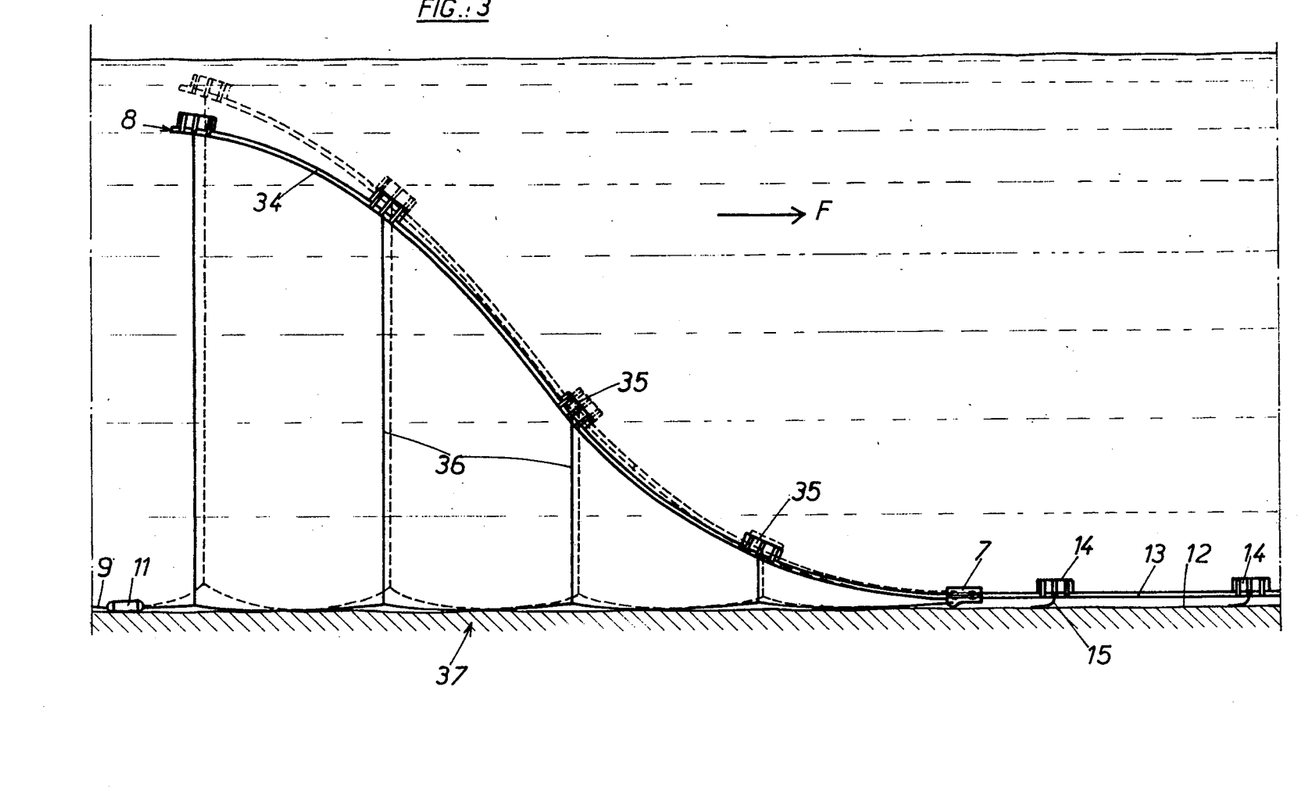

As shown in FIGS. 1 to 3, a pipeline section 1 is being towed in the sea, in the direction of the arrow F, by means of a towing cable 2 drawn by a tug 3 and fixed to a traction head 4 formed by a collar tightened by bolts 5 around the pipeline section a distance from its front end 6. Another collar 7, gripping in a similar manner the pipeline section at a distance from its rear end 8, is fixed to one end of a holding cable 9 of which the other end is attached to a small tug 10 which exerts a certain pulling force thereon such that the pipeline section 1 is maintained lightly in tension and does not risk forming S-bends or buckles on the sea bed. The holding cable 9 is furthermore provided, to the rear of the end 8 of the pipeline section, with a heavy block 11 forming a drag which rubs on the sea bed 12. The main portion 13 of the pipeline section, which is comprised between the collars 4 and 7, is equipped in known manner with a system of floats 14 which give it a slightly positive buoyancy and with chains or cables 15 which drag on the bottom 12 and act as aerostatic trail-ropes. The principal portion 13 of the pipeline section is thus maintained slightly above the bed 12.

The front end portion 16 of the pipeline section, i.e. the portion situated in front of the traction head 4, is provided with a plurality of floats 17 distributed along its length and each connected by a suspender 18 to the towing cable 2. The arrangement of one of these floats and its suspension is shown in more detail in FIGS. 4 and 5. The float 17 shown in these figures consists of a drum having a diameter greater than that of the pipeline section and held against the upper surface thereof by hoops 19 consisting of metal bands and provided with pyrotechnic rupture devices 20. To one of these hoops is attached one end of a suspender 18 the other end of which is fixed to the towing cable 2. The float is provided on its upper part with a tube 21 normally closed by a cock 22 and on its lower part with a tube 23 normally closed by a cock 24. This arrangement enables the buoyancy of the float to be regulated as required; to ballast it, it suffices to open temporarily the cock 24 and possibly also the cock 22 in order to allow a certain quantity of water to enter the float, and to lighten it, it suffices to connect the tube 21 to a source of compressed air and open temporarily the cocks 22 and 24 in order to discharge a certain quantity of water from the float. These operations can easily be carried out by divers provided with bottles of compressed air.

Figures 4, 5:
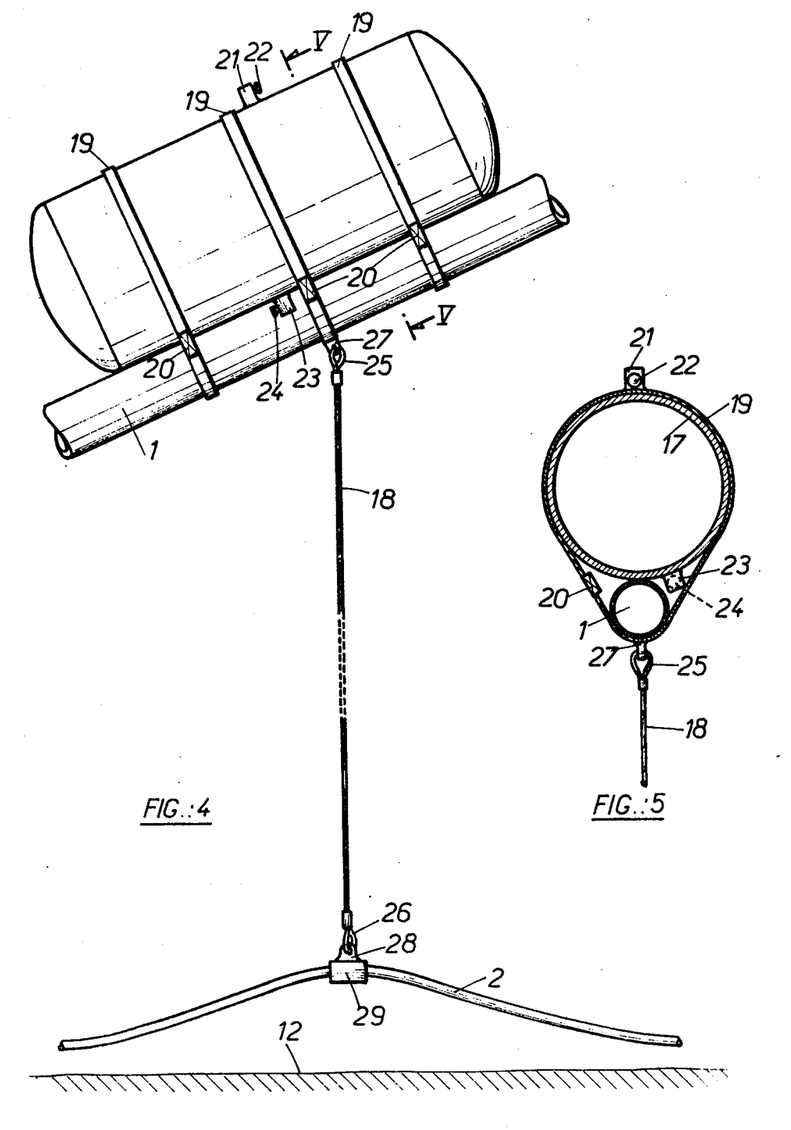
FIG. 4 is a partial side view, again on a larger scale, illustrating the action of the floats.
FIG. 5 is a section on the line V—V of FIG. 4.

The suspender 18 is provided at its ends with welded buckles 25 and 26 which engage respectively an eyelet 27 welded to one of the hoops 19 and an eyelet 28 carried by a sleeve 29 fitted on the cable 2. The floats 17 are controlled so that the assembly of floats 17, the front end portion 16, the suspenders 18 and the portion 30 of the towing cable situated facing, has a slightly negative buoyancy, the portion 16 of the pipeline floating "in the midst of water" and ballasting being assured by the weight of the cable 2 and the suspenders 18, the latter being stretched and the cable 2 resting on the bed 12 in its parts situated between them and forming a sort of festoon.

The towing cable 2 should be sufficiently strong to pull the pipeline section the length of which, as has already been indicated, could be as much as several kilometers. The cable 2 is thus very heavy and drags on the bed 12 in front of its portion 30. In the towing position shown in FIG. 1 and in full lines in FIG. 2, i.e. when the tug 3 pulls on the cable 2, the traction force applied to the front end of the portion 30 of this cable is thus practically horizontal and tends to straighten the portion 30 (i.e. to give it a rectilinear configuration) against the action of the suspenders 18 which pull the peaks 31 of the festoon upwards so that the latter is little accentuated. The lengths of the suspenders are chosen such that the pipeline section 16 forms, in the towing position, a curve such as that shown, placing the end 6 several meters (for example 7 to 8 meters) below the surface 32 of the sea, in order to protect this end against the effect of swell during towing, with radii of curvature large enough not to impose excessive flexing strains on the pipeline. The suspenders 18 form with the part 30 of the cable a system of trail-ropes which co-operates with the floats 17 to absorb the towing shocks and maintain the pipeline section 16 in stable equilibrium.

Figure 6:
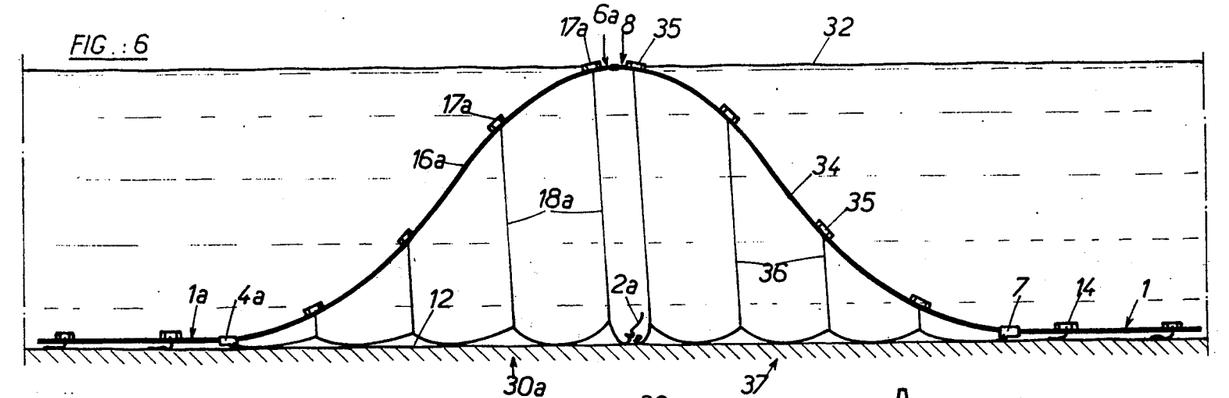
FIG. 6 is a view similar to FIGS. 2 and 3, showing the junction of two pipeline sections.

As soon as the tug 3 stops pulling on the towing cable 2, the stretching force, which opposes the action of the suspenders 18 drawing the peaks 31 of the festoon upwards, is no longer generated except by rubbing of the cable 2 on the bed 12. In the embodiment shown, it is assumed that the weight of the cable is not too great, so that its rubbing on the bed does not prevent sufficient sliding to allow the floats 17 to lift the pipeline section 16 to a rest position shown in broken lines in FIG. 2, in which the end 6 is not disposed more than four or five meters below the surface 32. From this rest position, it is possible to lighten all or some of the floats 17, for example in the manner indicated above in connection with FIGS. 4 and 5, so as to bring the pipeline section 16 into a position in which the front end 6 is located practically on the surface, so as to allow it to be welded easily to the rear end of a further pipeline sections as will be described hereinafter with reference to FIG. 6.

Figure 7:
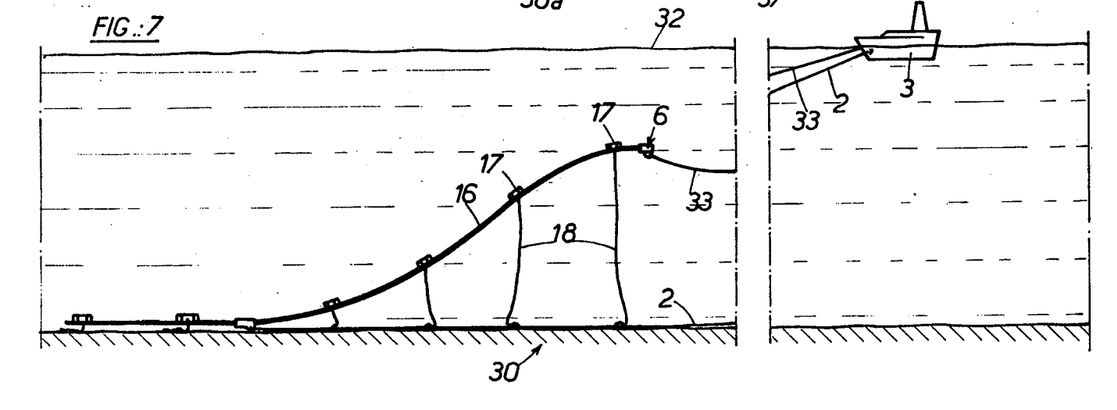
FIG. 7 is a view similar to FIG. 2, showing how the ends of a pipeline section can be located to resist a storm.

In the case of bad weather or if a storm is forecast, the pipeline laying operations are stopped, and to protect the end portion 16 against the effects of the sea, the floats 17 may be ballasted, for example in the manner indicated above with regard to FIGS. 4 and 5, in order to bring the section 16 into the fall back position shown in FIG. 7. In this position, the end 6 is located at a sufficient depth, for example of fifteen meters or more, below the surface 32, as not to risk being damaged by the swell. One can also, when the bad weather forecast is not very severe, simply pull on the towing cable 2 by means of the tug 3 in order to bring the pipeline section back into the towing position (FIG. 1), or even attach to the end 6 a cable 33 and pull thereon by means of the tug, then fix the cable 2 or 33 to a dead weight not shown, until it is possible to resume the pipeline laying operations. It is also possible to use these means together, i.e., to ballast the floats and pull on the cable or cables.

It has been stated above that the suspenders 18 and the portion of cable 30 produce a trail-rope effect in the towing position (FIG. 1). This effect is still more apparent in the rest positions (shown in broken lines in FIG. 2) and the fall back position (FIG. 7). The weights of the suspenders and of the portion of cable 30 are selected as a function of the buoyancy conferred by the floats 17 on the pipeline section 16, so as to maintain the latter in stable equilibrium in the various positions shown, in order that there is no risk of it deteriorating due to excessive flexing. In the embodiment shown, the suspenders 18 are metal cables as the tow-line 2 and the portion 30 thereof but, according to other embodiments, the suspenders and/or the portion 30 of the towline could consist of chains, articulated metal rods or bars, or any other equivalent arrangement.

The rear end portion 34 of the pipeline section 1 (FIGS. 1 to 3) is equipped with floats 35 and suspenders 36 similar respectively to the floats 17 and suspenders 18 of the front end portion 16. The suspenders 36 are attached to the portion 37 of the holding cable 9 and form therewith a system of trail-ropes which co-operates with the floats in order to maintain the portion 34 of the pipeline in stable equilibrium. The latter can be brought from the towing position (shown in FIG. 1 and in full lines in FIG. 3) into the rest position (shown in broken lines in FIG. 3), into a joining position (FIG. 6) or into a folded position by means similar to those described above for the portion 16. It may be pointed out, however, that the holding cable 9 is subjected to an effort much smaller than the towing cable 2 and can be much lighter than the latter. It is therefore necessary to keep the portion of cable 37 on the bed, by means of the drag 11, so that it can function as a trail-rope. However, this drag should not be too heavy so that its rubbing on the bottom does not risk preventing the portion 34 of the pipeline from rising to the rest position (shown in broken lines in FIG. 3) as soon as one ceases applying a holding force to the cable 9, and then rising into the joining position (FIG. 6) when the floats are lightened.

The pipeline section 1 is brought, by means of tugs 3 and 10, into a position in which its rear end portion 34 in which it is approximately an extension of the front end portion 16a of a similar previously laid pipeline section 16a (FIG. 6), and in which the rear end 8 of the pipeline section 1 is adjacent the front end 6a of the pipeline section 1a. The floats 35 and 17a are then lightened in the manner already described so as to bring the ends 8 and 6a to or very near the surface, and the two ends welded together. The floats are then progressively ballasted by the means described with reference to FIGS. 4 and 5 so as to cause the joined ends 34 and 16a to sink until they rest lightly on the bed. Finally, the pyrotechnic rupturing devices 20 (FIGS. 4 and 5) are actuated so as to free the hoops 19. The pipeline being thus freed from floats and suspenders, it is sufficient to send down divers to free the collars 4 and 7 in order to recover the cables, the suspenders and the floats 17 and 35. One can cause the principal portion 13 of the pipeline to stay resting on the bed by freeing, by similar means, the floats 14 and recovering them together with the trail-ropes 15.

Referring again to FIG. 2, it may be noted that a relatively short sliding of the cable 2 on the bed allows a relatively large ascent of the end 6 of the pipeline section. In effect, the height of ascent of each suspender 18 can be assimilated to the deflection 38 of an arc 39 formed by the cable 2 between this suspender and the adjacent suspender in the position shown in broken lines, while the sliding of the cable produced by the curvature of this arc 39 is equal only to the difference between the initial distance d between these two suspenders and the length of the chord 40 of this arc, a difference which is very small for arcs of slight curvature. It can also be seen from FIG. 2 that the distance of sliding of the cable 2 on the bed is only 60 to 70% of the ascent of the end 6 of the pipeline section 1. Normally, the rubbing of the cable on the bed should not therefore prevent the ascent of the end 6.

However, it can happen, especially if the trail-ropes 15 are very heavy in order to prevent the pipeline section deviating under the action of strong transverse currents, that one is obliged to use an equally robust towing cable 2 which is so heavy that its rubbing on the bed would prevent the end portion of the pipeline section, connected to the cable by the suspenders, from rising towards the surface. One could then use the arrangement shown in FIG. 8 in which the members playing the same part as in the previous figures are designated by the same references plus 100. In this figure, the suspenders 18 are replaced by cables 118 which are not connected to the towing cable 102 and the ends of which trail on the bed 112, thus forming trail-ropes, and the end 106 of the pipeline section 101 is fixed to a cable 133 which is connected to the tug 103 in parallel with the towing cable 102. There is no risk of these two cables becoming entangled if one takes the precaution of stretching them properly. In the embodiment shown, the floats 117 are moreover in the form of cylinders connected by lines 117a to the portion 116 of the pipeline and maintained near to the surface 132 or extending through said surface. This arrangement makes it possible to lighten and ballast the floats as required from the surface of the sea, for example by means of a boat carrying bottles of compressed air. The portion 116 of the pipeline is provided in various places with collars 117b to which are fixed the lines 117a and the trail-ropes 118. The pulling cable 133 is fixed to the collar 117b nearest to the front end 106 of the pipeline section.

The rear end portion (not shown) of the pipeline section 101 can be equipped either in the manner shown in FIG. 3 or with floats and trail-ropes similar to the trail-ropes 118.

Figure 8:
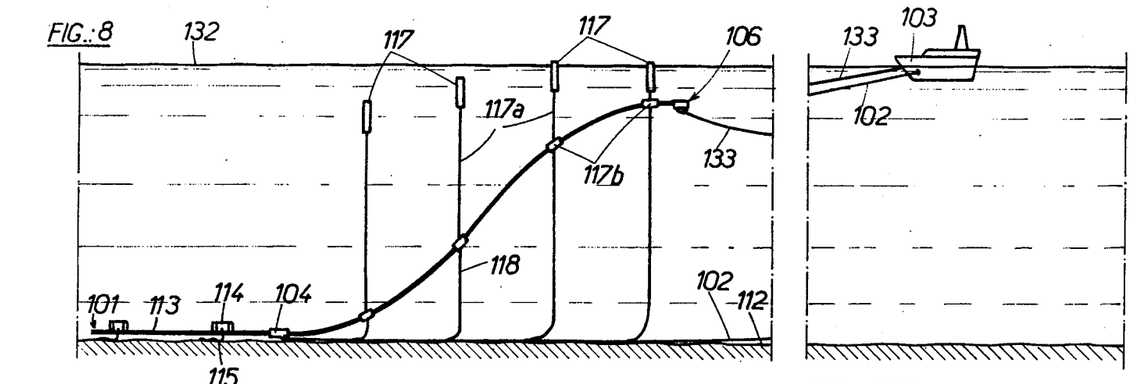
FIG. 8 is a view similar to FIG. 2, showing another embodiment.

Towing and joining of the pipeline section 101 are effected as described with reference to the preceding figures. The depth of immersion of the end 106 can be regulated by varying the tension of the pulling cable 133 and/or by varying the buoyancy of some at least of the floats 117, for example with the aid of the boat referred to above. Here again, one can also bring the end portion 116 into the joining position or into a fall back position if a storm is forecast. In the fall back position, the end portion of the pipeline will advantageously be immersed at a greater depth than in the preceding figures in order to bring the floats 117 to a depth of calm water.

However, it goes without saying that the trail-ropes 118 could equally well be associated with floats of a type different from the floats 117, for example with floats similar to those described with reference to FIGS. 4 and 5; it is then obviously sufficient to immerse the section 116 of the pipeline, in the fall back position, at a depth of calm water. Whatever type of floats used, the trail-ropes 118, or at least one or more thereof that are nearest to the end 106, are preferably less heavy in their lower end portions than in those which serve to maintain the system in stable equilibrium in the towing and fall back positions, so that the floats do not need to be lightened too much for raising the end 106 of the pipeline to the surface. In other words, the weight per meter length of the lower end portions of the trail-ropes 118 should preferably be smaller than the weight per meter length of the portions which alternately touch and leave the bed in the towing and fall back positions of the pipeline section 116.

Figure 9:
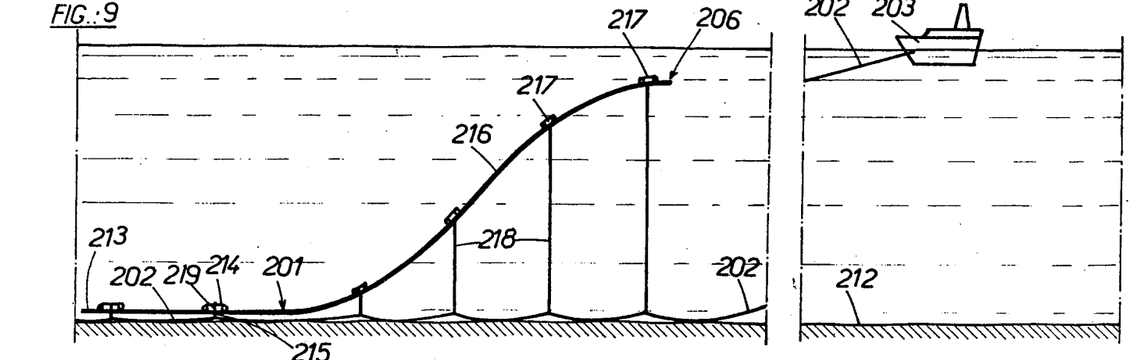
FIG. 9 is a view similar to FIG. 2, showing yet another embodiment.

FIG. 9, in which the elements playing the same part as in FIGS. 1 to 7 are designated by the same reference numerals with the addition of 200, illustrates an embodiment in which the towing cable 202, instead of hauling the pipeline section 201 by pulling on a traction head, extends right along the pipeline section and is connected to the main portion 213 thereof at a plurality of points by means of suspenders 215. The pulling effort applied to the pipeline section is thus distributed among the suspenders 215 which reduces considerably the pulling strains to which they are subjected. In the embodiment shown, the suspenders 215 are fixed, not directly to the pipeline section, but to hoops 219 of the floats 214 by means similar to those shown in FIGS. 4 and 5. In the rear part (not shown) of the pipeline section, the cable 202 extends rearwards as far as a drag similar to the block 11 of FIGS. 1 to 3, and as far as a holding device similar to the tug 10. The suspenders 215 and the portions of the cable 202 to which they are attached form a system of trail-ropes similar to that described above with reference to FIG. 2, and co-operate with the floats 214 to maintain the main portion 213 of the pipeline section in stable equilibrium above the bed 212.

The front end portion 216 of the pipeline section is equipped in the manner described above with reference to FIGS. 1 to 7, and the rear end portion (not shown) is advantageously equipped in the same manner. Towing and joining of the pipeline section 201 are effected in the manner described with reference to FIGS. 1 to 7.

Figure 10:
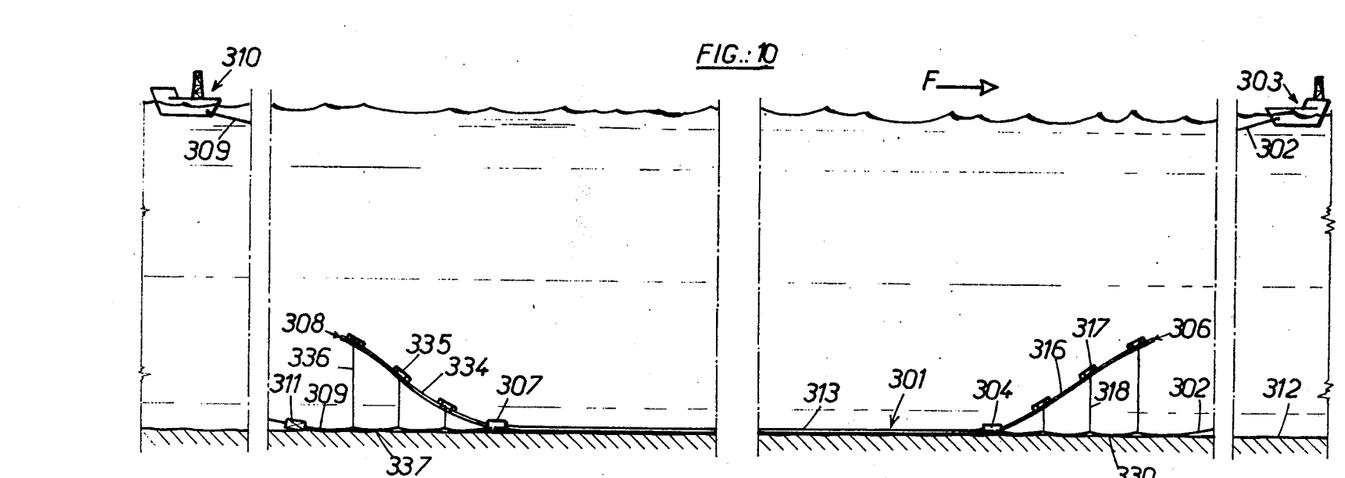
FIG. 10 is a schematic side view of a pipeline being towed towards a location between two spaced underwater installations.
Figure 11:
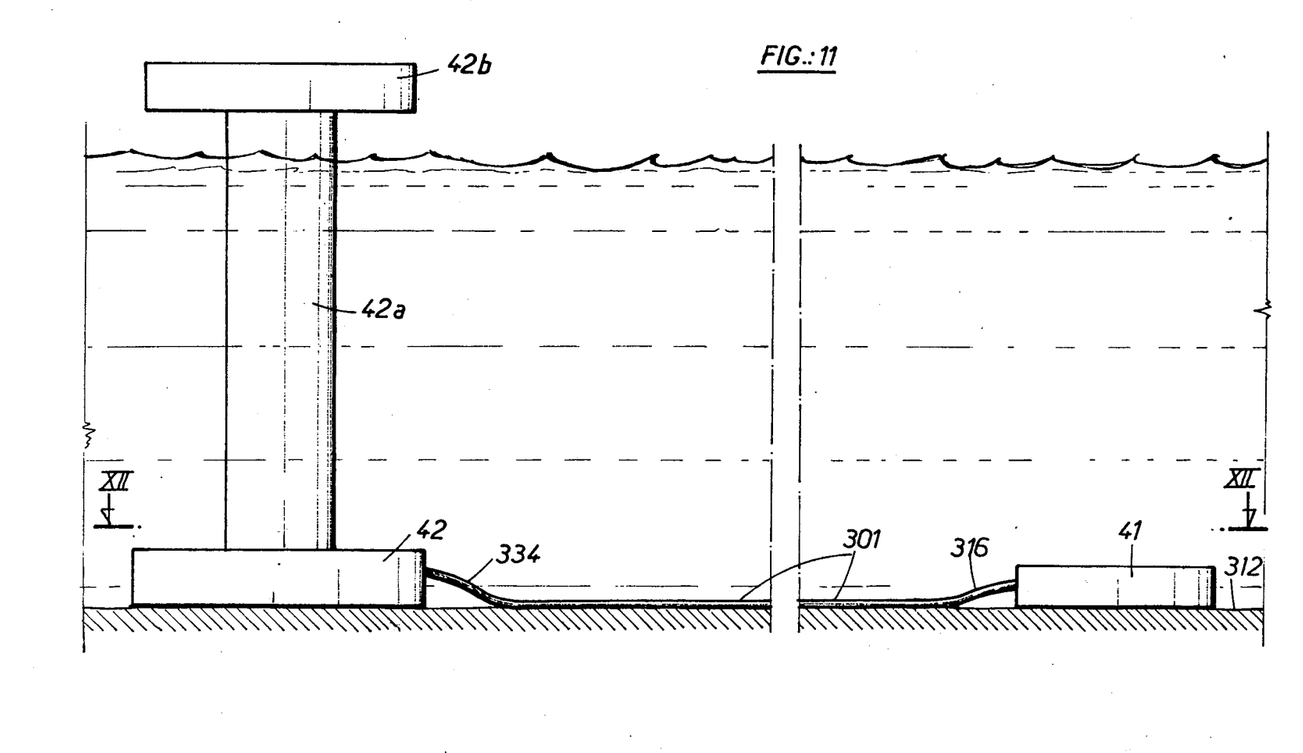
FIG. 11 is a schematic side view of the pipeline connected to the installation, namely an underwater petroleum borehole and the base of the underwater structure of a platform.
Figure 12:
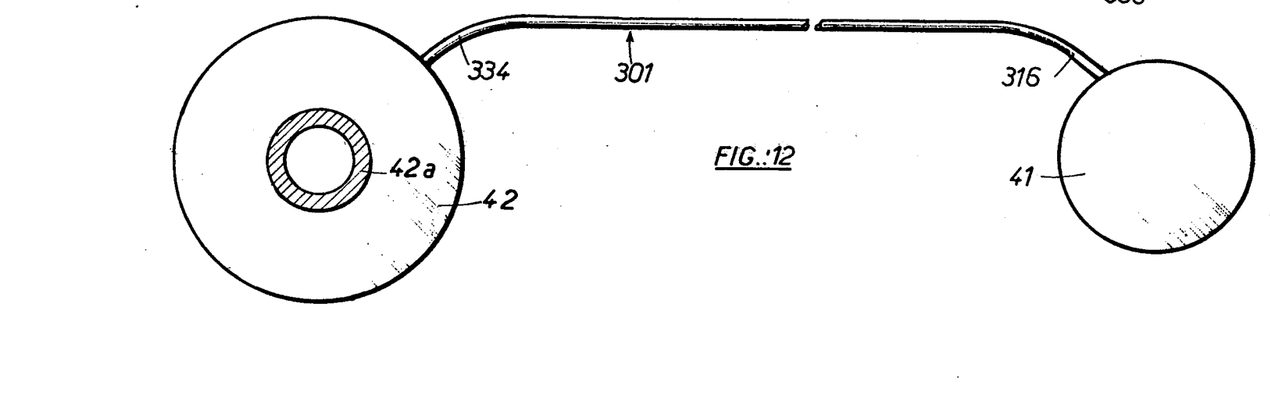
FIG. 12 is a sectional view on the line XII—XII of FIG. 11.

FIGS. 10–12, in which the elements playing the same part as in the preceding figures are designated by the same reference numbers with the addition of 300, show the laying of a submerged pipeline between an underwater petroleum borehole and the underwater structure of a platform.

FIG. 10 shows a pipeline 301 in the course of being towed in the sea, in the direction of the arrow F, by means of a towing cable 302 drawn by a tug 303 and fixed to a traction head 304 formed by a collar secured by bolts around the pipeline at a distance from its front end 306. Another collar 307, secured in a similar manner to the pipeline at a distance from its rear end 308, is fixed to an end of a holding cable 309 the other end of which is secured to a small tug 310 which exerts on it a pulling force so that the pipeline is kept slightly tensioned and does not risk forming S-bends or kinks on the sea bed. The retaining cable 309 is furthermore provided, to the rear of the end 308 of the pipeline, with a heavy block 311 forming a drag which rubs on the sea bed 312. The intermediate portion 313 of the pipeline, which is comprised between the collars 304 and 307, has a negative buoyancy either per se (being for example filled with water) or in association with ballasting means not shown, so that it rests on the bed.

The front end portion 316 of the pipeline, that is to say the portion situated in front of the traction head 304, is provided with a plurality of floats 317 distributed over its length and each connected by a suspender 318 to the towing cable 302. The length of the suspenders 318 is chosen so that the portion 316 of the pipeline floats "in the midst of water" at a distance above the cable 302 resting on the bed, but far below the surface of the body of water. The floats 317 and the suspenders 318 are similar to those described hereinbefore, in which means are particularly disclosed enabling the floats to be as desired, during towing, the floats being regulated so that the pipeline assembly comprising the floats 317, the front end portion 316 of the pipeline, the suspenders 318 and the portion 330 of the towing cable situated facing, has a slightly negative buoyancy, the pipeline portion 316 floating "in the midst of water" and ballasting being assured by the weights of the cable 302 and the suspenders 318, the latter being taut and the portion 330 of the cable resting on the bed 312 in the parts between them thus forming a kind of festoon. As is explained hereinbefore, the suspenders 318 and the portion 330 of the cable produce a trail-rope effect during towing and even more so when the tug 303 ceases to pull on the cable 302.

The rear end portion 334 of the pipeline 301 is also equipped with floats 335 connected by suspenders 336 to the portion 337 of the retaining cable 309 located opposite and, still as hereinbefore, the suspenders 336 and the portion 337 of the cable produce a trail-rope effect during towing and even more so when the tug 310 ceases to pull on the retaining cable 309.

The pipeline 301 is thus brought, by towing it as has been explained to a position in which it is located parallel to a line joining the centre of an underwater structure 41 containing the irruption head (or Christmas tree) of a petroleum borehole to that of the base 42 of an underwater structure 42a supporting a platform 42b (FIGS. 11 and 12), while keeping clear of these elements 41 and 42. One thus benefits from the fact that the end portions 316 and 334 of the pipeline, being maintained in equilibrium "in the midst of water" by the trail-ropes, are relatively flexible and easy to manipulate, for engaging them respectively in the structure 41 and in the base 42 and connecting them to the pipework (not shown) that they contain. One can then ballast the floats 317 and 335 or even liberate them, in the manner hereinbefore described, to allow part of the portions 316 and 334 of the pipeline to rest on the bed (FIG. 11).

It goes without saying that the embodiment described is only an example and could be modified, notably by the substitution of technical equivalents, without departing from the scope of the invention as defined in the appended claims. In particular, one could utilise any of the devices described with reference to FIGS. 1 to 9 for towing the pipeline described with reference to FIGS. 10 to 12. The front and/or rear end portion of the pipeline could be equipped both with the suspenders 18 and the trail-ropes 118.

One could also not depart from the scope of the invention by replacing the tugs by other hauling devices.

I claim:

1. A method of laying a pipeline assembly on the bed of a body of water to interconnect first and second underwater installations, comprising the steps of: towing a pipeline assembly section to bring the same from the first to the second underwater installation, while making front and rear end portions of the pipeline assembly section buoyant to maintain said end portions in the midst of water and while giving a length of the pipeline assembly intermediate said end portions a negative buoyancy to maintain the same on the sea bed to trail thereon, thereby to prevent said intermediate length of the pipeline assembly from deviating; engaging the rear and fore ends of the pipeline assembly section into said first and second underwater installations respectively; and thereafter ballasting said fore and rear end portions of the pipeline assembly to rest on the bed.

2. A method according to claim 1, in which the towing step includes exerting a pulling force at a point spaced from the front end of the pipeline assembly, and exerting a holding force at a point spaced from the rear end.

3. Apparatus for towing a pipeline assembly section on the bed of a body of water in order to interconnect two spaced underwater installations, comprising:
    (a) towing means, including a traction machine coupled during towing of said section for applying a traction effort at a traction point on the pipeline assembly section to draw the same forward, said traction point being spaced from the front end of said pipeline assembly;
    (b) holding means, including a holding machine connected during towing of said section for applying a holding effort at a holding point on the pipeline assembly to maintain the same in tension, said holding point being spaced from the rear end of said pipeline assembly;
    (c) traction head means about the pipeline section connecting a front end portion of said pipeline assembly to the traction machine, said front end portion being situated in front of said traction head;
    (d) ballasting means arranged along an intermediate portion of said pipeline assembly, located between said traction point and said holding point, for supporting said intermediate portion of said pipeline section on the bed of the body of water during towing, thereby to prevent said intermediate portion from deviating; and
    (e) buoyancy means conferring during towing of said section a positive buoyancy to said front end portion and to a rear end portion situated to the rear of said holding point, in order to maintain said front rear end portions of the pipeline assembly in the midst of water, thereby to make easier respective connections of said front and rear ends to said underwater installations, respectively.

4. Apparatus according to claim 3, in which said ballasting means incorproate a plurality of short trail-ropes spaced along said intermediate portion of the pipeline assembly.

5. Apparatus according to claim 3, comprising a system of trail-ropes for maintaining said front and rear end portions of the pipeline assembly above the bed of the body of water.

6. Apparatus according to claim 3, in which said towing means and said holding means comprise respectively a towing tow-line and a holding tow-line connecting respectively the traction machine to the traction point and the holding machine to the holding point.

7. Apparatus according to claim 3, in which said towing means and said holding means comprise a traction distribution cable connected to said traction machine and to said holding machine, and means connecting said distribution cable to said traction point, to said holding point, and to a plurality of points on said intermediate portion.

8. Apparatus according to claim 3, in which said buoyancy means comprise a plurality of floats and means for regulating the buoyancy of some at least of said floats.

9. Apparatus according to claim 3, in which said means connecting said front end portion to the traction machine comprise a plurality of suspenders connecting a plurality of points on said front end portion to a tow-line connecting said traction point to said traction machine.

10. Apparatus according to claim 9, in which said suspenders are connected at spaced points to said tow-line to form therewith a system of trail-ropes.

11. Apparatus according to claim 3, in which said means connecting said front end portion to the traction machine comprises a cable connecting said front end to the traction machine.

12. Apparatus according to claim 3, comprising a plurality of trail-ropes fixed to a plurality of points on at least one of said front and rear end portions and trailing on the bed of the body of water.

13. Apparatus according to claim 12, in which at least some of the trail-ropes comprise a lower end portion less heavy than the rest of its length.

14. Apparatus according to claim 3, including a retaining machine and comprising traction coupling means for connecting said rear end portion of said pipeline assembly section to the retaining machine.

15. Apparatus according to claim 14, in which said means connecting said rear end portion to the holding machine comprise a plurality of suspenders connecting a plurality of points on said rear end portion to a holding tow-line connecting said holding point to said holding machine.

16. Apparatus according to claim 15, in which said suspenders are connected at spaced points to said towline to form therewith a system of trail-ropes.

17. Apparatus according to claim 14, in which said means connecting said rear end portion to the holding machine comprise a cable connecting said rear end to said holding machine.

18. Apparatus according to claim 3, in which said holding means comprise a cable connected to said holding point and to the holding machine, and a heavy block connected to the cable to the rear of said holding point to trail on the bed.

* * * * *